United States Patent Office 3,666,440
Patented May 30, 1972

3,666,440
METHOD OF RECOVERING COPPER FROM SLAG
Hiroshi Kono, Kagawa-gun, and Takeyoshi Shibazaki, Urawa, Japan, assignors to Mitsubishi Kinzoku Kogyo Kabushiki Kaisha, Tokyo-to, Japan
Filed Mar. 13, 1970, Ser. No. 19,260
Int. Cl. C22b 9/10, 15/14
U.S. Cl. 75—76                    5 Claims

ABSTRACT OF THE DISCLOSURE

Copper is recovered from copper-containing slag by putting the matte and slag in a molten state together in a slag treating furnace at a volume ratio of more than 1:5, the melts in the furnace being maintained under agitation so that the slag and matte are in intimate contact so as to efficiently transfer copper from the slag to the matte.

BACKGROUND OF INVENTION

This invention relates to a novel method of recovering copper from slag; more particularly, it is concerned with a method of recovering copper in the form of a molten matte from a copper-containing slag, which is produced during the smelting process, by treating the same in its molten state.

Lowering of the copper content in the slag has been and is still one of the most important matters in the copper smelting process. Particularly, as converter slag contains large quantity of copper, various treatments for effective recovery of the copper are carried out depending on the smelting system adopted in the respective smelters. In the case of the reverberatory furnace method, for example, the slag is charged directly into the reverberatory furnace in the molten state, which causes various troubles in the furnace bed due to accumulation of magnetite. In some cases, an electric furnace is used, wherein molten slag is charged into the electric furnace and a flux for adjusting the slag composition such as siliceous ore, lime stone, etc. together with pyrites or elementary sulfur are added thereto. This electric furnace method, however, is not so advantageous from the point of energy consumption depending on the condition of location because it necessitates electric power, and, moreover, is not so highly efficient in its furnace operations because of slow rate of melting of the flux and pyrites. As the other methods for treatment, there have been known (a) ore dressing by floatation wherein the slag is cooled to solidify it and is then pulverized into fine particles, and (b) sulfatizing roasting, or chlorinating roasting. However, these methods necessitate large scaled installations, and, moreover, the sustained heat of molten slag cannot be utilized effectively, hence they are used only in special cases.

SUMMARY OF INVENTION

It is therefore an object of the present invention to provide a novel method of recovering copper from slag in the form of molten matte in a most economical manner and at a high rate of recovery by treating the slag in molten state at high rate of furnace efficiency.

According to the present invention, there is provided a method of recovering copper from slag, wherein a copper-containing slag and a low grade matte are made to co-exist in the molten state at a volume ratio corresponding to at least ⅕ of the total volume of the slag, and then they are agitated by a mechanical or physical means so as to cause them to come into close contact with each other, thereby extracting a substantial part of the copper content from the slag into the matte.

The above-described principle and object of the present invention will become more understandable from the following detailed description of the preferred embodiments of the invention when read in conjunction with the accompanying drawing.

DETAILED DESCRIPTION OF INVENTION

Figure 1:
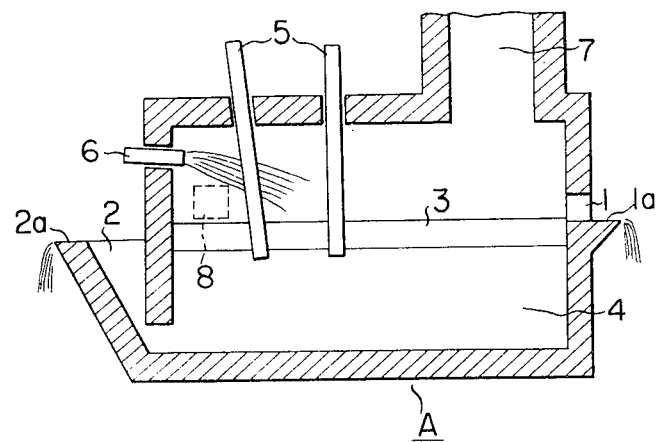
FIG. 1 is a schematic sectional view of one example of an apparatus (or slag treating furnace) to carry out the method according to the present invention.
Figure 2:
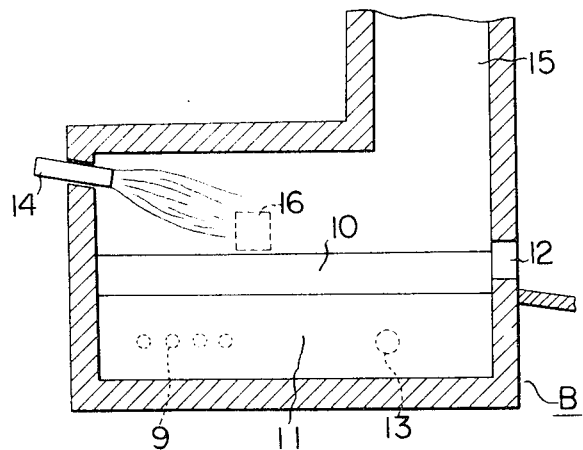
FIG. 2 is a schematic sectional view of another example of the slag treating furnace.

Referring to FIG. 1, the slag treating furnace A to be used for the present invention is provided with a slag overflow 1, a matte tapping siphon 2, lance pipes 5 to feed pyrites or copper sulfide concentrate or sulfur directly into the melt within the furnace together with fuel and air, an auxiliary burner 6 to maintain the temperature of the melt, an exhaust gas duct 7, and slag charging port 8, through which slag or slag and low grade matte are continuously charged into the furnace interior in the molten state.

In the furnace interior, the matte and slag are co-existent in their molten state. To this molten bath, various sulfurizing agents such as pyrites, copper sulfide ore, sulfur, etc. in granular or particle form to melt and produce matte, and siliceous flux or lime stone or a mixture of both in granular or particle form are directly blown on a high speed current stream through the respective separate lances or through the same lances at a constant feeding rate to be determined by the treating conditions of the melt. Thus, when both sulfurizing agent and flux are granulated or pulverized for being directly blown into the melt, they can be rapidly molten, the sulfurizing agent forming the matte, and the flux melting in the slag serving to adjust the slag composition. It is to be noted that the sulfurizing agent may not be added when the molten matte available is of a low grade.

In case reverberatory furnace slag is treated, no flux may be added. Also, when converter slag is to be treated, a carbonaceous reductive agent may be added in some cases so as to promote reduction of magnetite.

Due to the fact that the materials to be fed into the furnace are blown into the furnace by being carried on a gas, the furnace interior is in the state of vigorous agitation, which enables the slag and the matte to be in intimate contact with each other, whereby the copper content in the slag is promptly absorbed into the matte. This agitating state is so adjusted that it is in tubulent stage in at least at one portion within the furnace interior, but it is subdued in the vicinity of the slag overflow port as well as the matte tapping port so as to tap out the matte and the slag substantially separately. Control of the agitating state can be done by changing the arrangement of the lances, depth of immersion into the melt of the lances, and blowing quantity of gas per lance.

The copper content in the slag after the treatment is approximately proportional to the grade of the coexisting matte. Therefore, when the matte in the slag treatment furnace is of a low grade, the rate of copper recovery is high, but the cost for treating the matte increases. On the other hand, when the grade of the matte is high, the matte treating cost decreases, but the actual rate of copper recovery is simultaneously lowered. On account of this, the quantity of the sulfurizing agent to be mixed into the batch should be adjusted to a predetermined value such that it is not so low as to substantially reduce the grade of the matte so that recovering copper therefrom, is not advantageous and that it is not so high as to cause the copper recovery from the slag to be so inferior that the

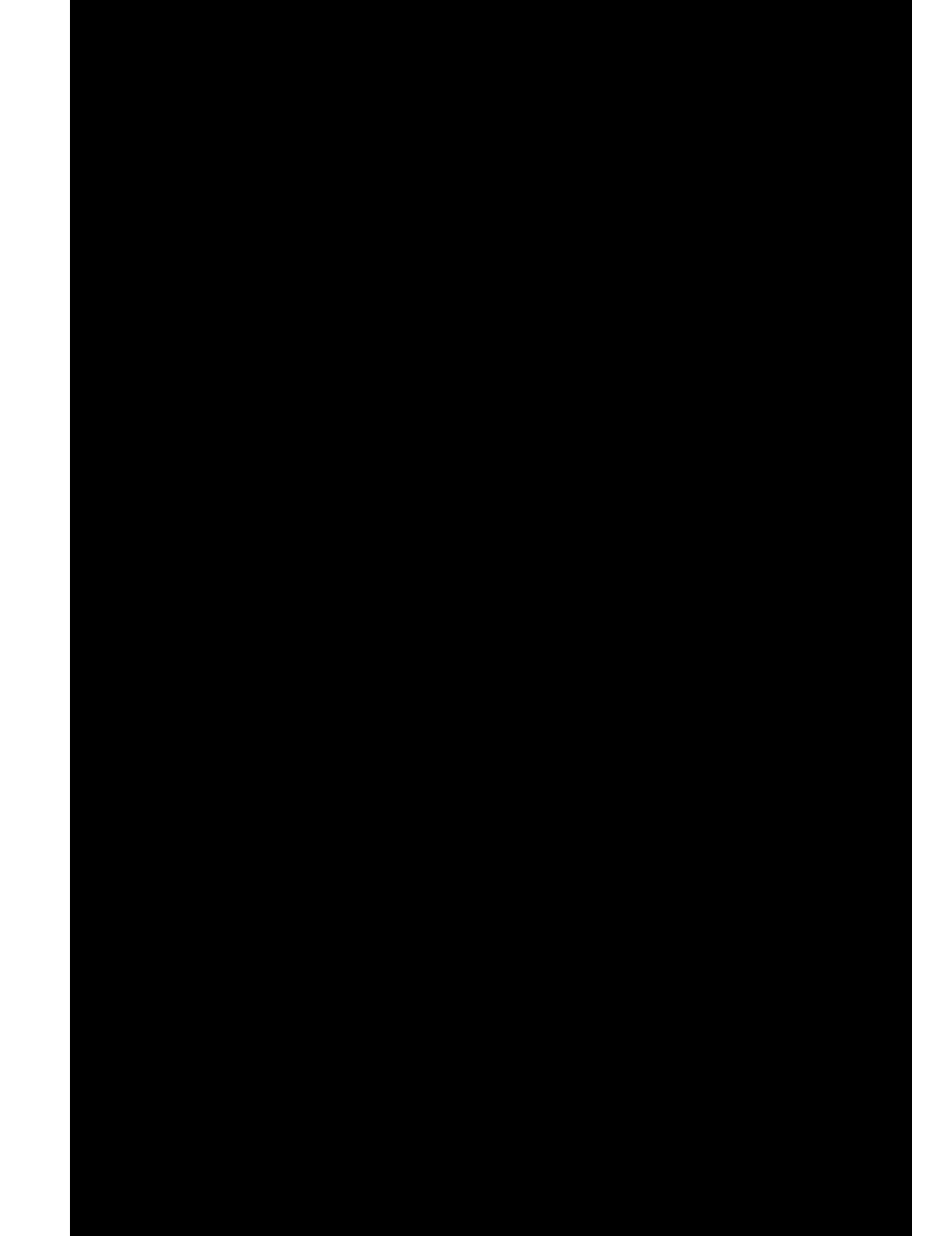

together with air at a flow rate of 800–1000 Nm.³/hr. and at a gauge pressure of 1 kg./cm.² through the tuyeres. After about 50 minutes treatment, 1 ton of the treated slag was tapped out, thereafter 1 ton of converter slag was charged for every 1 hour and 1.3 tons of the treated slag was tapped out. On the other hand, 0.4 to 0.5 ton of the matte was tapped out for every 5 hours. After 24 hours from commencement of the furnace operation, a steady state was attained. The representative analytical compositions of the raw material and product at this state is shown in the following Table 1. The grade of the matte was 38 to 45% Cu, and the copper content in the treated slag was 0.3 to 0.5%.

TABLE 1

| | Percent of— | | | | |
|---|---|---|---|---|---|
| | Cu | Fe | S | SiO₂ | CaO |
| Raw material: | | | | | |
| Converter slag | 2.1 | 46.7 | 0.6 | 21.0 | 0.3 |
| Copper sulfide concentrate | 18.8 | 33.9 | 38.3 | 1.2 | 0.3 |
| Silicate ore | | | | 81.2 | 0.9 |
| Lime stone | | | | 2.0 | 53.4 |
| Product: | | | | | |
| Matte | 41.5 | 32.6 | 24.8 | | |
| Slag | 0.4 | 34.6 | | 33.5 | 8.3 |

Example 2

The slag treatment furnace as shown in FIG. 1 provided with the matte tapping siphon and the slag overflow port was pre-heated to a temperature of more than 1,200° C. Then, 5 tons of reverberatory furnace slag was continuously charged into the furnace, after which 100 l./hr. of heavy oil, 1,800 kg./hr. of pyrites were blown into the melt in the furnace together with air at a flow rate of 4,600 Nm.³/hr. and at a gauge pressure of 0.8 kg./cm.². The furnace was operated for about 5 hours under this condition, during which slag was caused to flow out of the slag overflowing port. After this operation, the matte within the furnace increased to about 5 times as much as the slag in terms of volume ratio, at which point the matte tapping siphon was opened and the level of the overflowing weir was adjusted to be lower by 3 cm. from the melt surface in the furnace, whereby the thickness of the slag phase in the furnace was adjusted to become about 10 cm., and the volume ratio of the matte and slag was maintained at about 1:5. At a subsequent stage, about 6 tons/hr. of the reverberatory slag in molten state was continuously charged into the furnace, and then 50 to 70 l./hr. of heavy oil and 400 kg./hr. of pyrites were directly blown into the melt through five lances together with air at a flow rate of 900 to 1,100 Nm.³/hr. and at a gauge pressure of 0.8 kg./cm.², while continuously tapping the slag out of the slag overflow port and the matte out of the matte tapping siphon, respectively. The furnace operation reached its steady state after 30 hours or so. The representative analytical compositions of the raw material and product at this state are shown in the following Table 2. The grade of the matte was 8 to 15% Cu, and the copper content in the treated slag was 0.05 to 0.20%.

TABLE 2

| | Percent of— | | | | |
|---|---|---|---|---|---|
| | Cu | Fe | S | SiO₂ | CaO |
| Raw material: | | | | | |
| Reverberatory furnace slag | 0.5 | 34.0 | | 36.5 | 4.8 |
| Pyrites | 0.6 | 41.2 | 46.1 | 7.8 | 0.1 |
| Product: | | | | | |
| Matte | 9.6 | 53.6 | 25.2 | | |
| Slag | 0.08 | 34.5 | | 36.8 | 5.2 |

Example 3

The slag treatment furnace as mentioned in the above Example 1 was preheated to more than 1,200° C. Into this furnace, 3 tons of reverberatory furnace matte, 2 tons of converter slag, 200 kg. of silicate ore, and 300 kg. of lime stone were charged, while blowing air and heavy oil from tuyeres at a rate of 1,000 Nm.³/hr. and 80–100 l./hr., respectively. After about 1 hour of the furnace operation, 1.5 tons of slag was tapped out, and, subsequently, 1 ton of converter slag, 100 kg. of siliceous one, and 150 kg. of lime stone were charged. After about 30 minutes of the furnace operation, about 1 ton of the slag was tapped out. Thereafter, the steps of charging into the furnace the converter slag, silicate ore, and limestone at the constant mixing ratio, and of tapping out 1 to 1.3 tons of slag from the furnace after about 30 minutes operation were repeated. When approximately 10 tons of the slag was treated, the entire matte was tapped out of the furnace. The matte grade at this time was about 47%. In this way, 50 tons of converter slag was treated. The copper content in the slag after the treatment was 0.3 to 0.4% immediately after charging the reverberatory furnace matte into the furnace and was 0.4 to 0.5% just before matte tapping.

The representative analytical compositions of the raw material and product are shown in the following Table 3.

TABLE 3

| | Percent of— | | | | |
|---|---|---|---|---|---|
| | Cu | Fe | S | SiO₂ | CaO |
| Raw material: | | | | | |
| Converter slag | 1.5 | 41.5 | | 25.3 | 0.4 |
| Reverberatory matte | 31.2 | 32.7 | 26.1 | | |
| Silicate ore | | | | 89.5 | 0.5 |
| Lime stone | | | | 2.0 | 51.2 |
| Product: | | | | | |
| Matte | 48.5 | 22.5 | 23.1 | | |
| Slag | 0.42 | 35.4 | | 29.5 | 8.1 |

What we claim is:

1. A method for recovering copper from slag which comprises
   (a) continuously charging copper-containing slag in a molten state at a constant rate into a slag-treating furnace,
   (b) blowing a sulfurizing agent selected from the group consisting of pyrites, copper sulfide ore, sulfur, and a mixture thereof, directly into the melts in the furnace at a constant ratio with respect to slag charging rate through lances or tuyeres to cause said sulfurizing agent to melt immediately to produce low grade matte, and also to effect agitation of the slag and matte so that the slag and matte are contacted intimately with each other,
   (c) continuously discharging the treated slag from the furnace by overflow through a slag tapping port,
   (d) continuously discharging the matte from a matte siphon, and
   (e) maintaining the overflow level of matte and slag at constant heights, thereby to maintain the matte to slag ratio at a constant value of at least 1:5.

2. Method of recovering copper from slag which comprises:
   (a) continuously charging copper-containing slag and low-grade matte in a molten state at a predetermined ratio into a slag treatment furnace provided with a slag tapping port, and a matte tapping port, and a plurality of gas and material feeding nozzles,
   (b) causing the matte to flow out of the matte tapping port and the slag out of the slag tapping port to maintain the outflow level of the matte and the outflow level of the slag at a predetermined level, thereby maintaining the volume ratio of the matte and slag at least at 1:5; and
   (c) agitating the melts to effect their intimate contact, thereby extracting a substantial part of the copper content from the slag into the matte.

3. The method according to claim 1, in which slag composition is adjusted by adding to the slag an additive selected from group consisting of siliceous flux, lime, and a mixture thereof.

4. The method according to claim 2, in which slag composition is adjusted by adding to the slag an additive selected from group consisting of siliceous flux, lime, and a mixture thereof.

5. The method according to claim 2, in which the matte is formed by directly blowing into the slag and matte in molten state an additive, at a predetermined ratio with respect to the slag to maintain the grade of the matte in the furnace at less than 50%, selected from group consisting of pyrites, copper sulfide ore, sulfur, and a mixture thereof.

References Cited
UNITED STATES PATENTS

| | | | |
|---|---|---|---|
| 981,850 | 1/1911 | Fleming | 75—74 X |
| 1,238,279 | 8/1917 | Dwight | 75—74 X |
| 1,231,349 | 6/1917 | Herreshoff | 75—72 |
| 1,544,048 | 6/1925 | Stout | 75—72 |
| 1,822,588 | 9/1931 | Fowler | 75—72 |
| 3,351,462 | 11/1967 | Arentzen | 75—74 |

L. DEWAYNE RUTLEDGE, Primary Examiner

J. E. LEGRU, Assistant Examiner

U.S. Cl. X.R.

75—83, 93